US009517777B2

(12) United States Patent
Hall et al.

(10) Patent No.: US 9,517,777 B2
(45) Date of Patent: Dec. 13, 2016

(54) LANE DEPARTURE FEEDBACK SYSTEM

(71) Applicant: Ford Global Technologies, LLC, Dearborn, MI (US)

(72) Inventors: Amber LaVerne Hall, Oak Park, MI (US); Michael Kolich, Windsor (CA); Sean David Fannin, Taylor, MI (US); Keith Allen Godin, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/534,285

(22) Filed: Nov. 6, 2014

(65) Prior Publication Data

US 2016/0129920 A1    May 12, 2016

(51) Int. Cl.
*B60W 20/00* (2016.01)
*B60W 50/16* (2012.01)
*B60W 40/08* (2012.01)

(52) U.S. Cl.
CPC .............. *B60W 50/16* (2013.01); *B60W 40/08* (2013.01); *B60W 2040/0827* (2013.01)

(58) Field of Classification Search
CPC ... B60N 2/3011; B60N 2/3013; B60N 2/3065; B60N 2/36; B60Q 1/346; B60Q 1/38; B60W 30/12; B62D 15/029; B62D 1/02; E21B 44/00; G01S 17/023; G01S 17/89; G01S 17/936; G06F 3/0346; G06F 3/04815; G06T 17/00; G08G 1/67; H05K 5/0073; H05K 7/02
USPC .. 700/264; 340/435, 905; 345/156; 348/140; 361/679.01; 297/15; 175/56; 601/47
See application file for complete search history.

(56) References Cited

U.S. PATENT DOCUMENTS

| 2,958,369 A | 11/1960 | Pitts et al. |
| 3,403,938 A | 10/1968 | Cramer et al. |
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |

(Continued)

FOREIGN PATENT DOCUMENTS

| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Behrang Badii
*Assistant Examiner* — Sanjeev Malhotra
(74) *Attorney, Agent, or Firm* — Vichit Chea; Price Heneveld LLP

(57) ABSTRACT

A lane departure warning system for a vehicle includes a positional input device and a seat having an inflatable bladder therein and a vibrational unit coupled with the bladder. A controller is communicatively coupled with the positional input device and with the vibrational unit and includes electronic circuitry programmed to detect a lane departure based on a signal from the positional input device and to cause the vibrational unit to vibrate in response thereto.

15 Claims, 6 Drawing Sheets

(56) References Cited

U.S. PATENT DOCUMENTS

| | | |
|---|---|---|
| 4,541,669 A | 9/1985 | Goldner |
| 4,629,248 A | 12/1986 | Mawbey |
| 4,720,141 A | 1/1988 | Sakamoto et al. |
| 4,915,447 A | 4/1990 | Shovar |
| 5,171,062 A | 12/1992 | Courtois |
| 5,174,526 A | 12/1992 | Kanigowski |
| 5,518,294 A | 5/1996 | Ligon, Sr. et al. |
| 5,560,681 A | 10/1996 | Dixon et al. |
| 5,647,635 A | 7/1997 | Aumond et al. |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,199,951 B1 * | 3/2001 | Zeile .................. B60N 2/3011 297/15 |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,072,764 B2 | 7/2006 | Donath et al. |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,344,189 B2 | 3/2008 | Reed et al. |
| 7,350,859 B2 | 4/2008 | Klukowski |
| 7,382,240 B2 | 6/2008 | Egelhaaf |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,925 B2 | 3/2010 | Beck et al. |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,111,147 B2 | 2/2012 | Litkouhi |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 8,342,607 B2 | 1/2013 | Hofmann et al. |
| 2004/0195870 A1 | 10/2004 | Bohlender et al. |
| 2004/0212589 A1 * | 10/2004 | Hall .................. G06F 3/0346 345/156 |
| 2005/0200166 A1 | 9/2005 | Noh |
| 2006/0043777 A1 | 3/2006 | Friedman et al. |
| 2007/0120401 A1 | 5/2007 | Minuth et al. |
| 2008/0174159 A1 | 7/2008 | Kojima et al. |
| 2009/0066122 A1 | 3/2009 | Minuth et al. |
| 2009/0165263 A1 | 7/2009 | Smith |
| 2009/0322124 A1 | 12/2009 | Barkow et al. |
| 2010/0038937 A1 | 2/2010 | Andersson et al. |
| 2010/0140986 A1 | 6/2010 | Sawada |
| 2010/0148948 A1 * | 6/2010 | Murphy ................ B60W 30/12 340/435 |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |

(56) References Cited

U.S. PATENT DOCUMENTS

| | | |
|---|---|---|
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0199200 A1* | 8/2011 | Lueke .................. B60Q 1/38 340/435 |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0081234 A1* | 4/2012 | Shaffer ................ G08G 1/167 340/905 |
| 2012/0081544 A1* | 4/2012 | Wee .................... G01S 17/023 348/140 |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0222900 A1* | 9/2012 | Rodney ................ E21B 44/00 175/56 |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2013/0342366 A1 | 12/2013 | Kiefer et al. |
| 2014/0135991 A1* | 5/2014 | Summer ................ B25J 13/02 700/264 |
| 2014/0139979 A1* | 5/2014 | Blazic .................. H05K 7/02 361/679.01 |
| 2014/0180181 A1* | 6/2014 | von Oepen ........... A61H 23/02 601/47 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infinititig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

LANE DEPARTURE FEEDBACK SYSTEM

FIELD OF THE INVENTION

The present invention generally relates to a lane departure warning system for a vehicle. In particular, the lane departure warning system includes output functionality integrated into a corresponding vehicle seat.

BACKGROUND OF THE INVENTION

When operating a motor vehicle, a driver may become drowsy or distracted, which may lead to the vehicle, while still generally under the control of the driver, moving out of the lane in which the vehicle is traveling. Such a potential or actual unintended lane departure may result in the vehicle ultimately leaving the roadway, collision with a vehicle traveling in an adjacent lane, or loss of vehicle control by the driver overcorrecting upon becoming aware of the lane departure. Various systems can monitor the path of a vehicle and detect a lane departure and alerting the driver when necessary. However, existing lane departure warning systems may not provide proper indication of a potential or actual lane departure to a driver. Accordingly, further advances in such systems may be desired.

SUMMARY OF THE INVENTION

According to one aspect of the present invention, a lane departure warning system for a vehicle includes a positional input device and a seat having an inflatable bladder therein and a vibrational unit coupled with the bladder. A controller is communicatively coupled with the positional input device and with the vibrational unit and includes electronic circuitry programmed to detect a lane departure based on a signal from the positional input device and to cause the vibrational unit to vibrate in response thereto.

According to another aspect of the present invention, a vehicle seating assembly includes a seat base, a seatback, a cover stock disposed over the seatback and the seat base. An inflatable bladder is disposed in at least one of the seat base and the seatback, beneath the cover stock, and is configured to move between a first position, wherein the bladder is deflated, and a second position, wherein the bladder is inflated. A vibrational unit is coupled with the bladder.

According to another aspect of the present invention, a motor vehicle includes a positional input device, a seat having an inflatable bladder therein and a vibrational unit coupled with the bladder, a lane departure warning controller communicatively coupled with the positional input device and with the vibrational unit. The controller includes electronic circuitry programmed to detect a lane departure based on a signal from the positional input device and to cause the vibrational unit to vibrate in response thereto.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
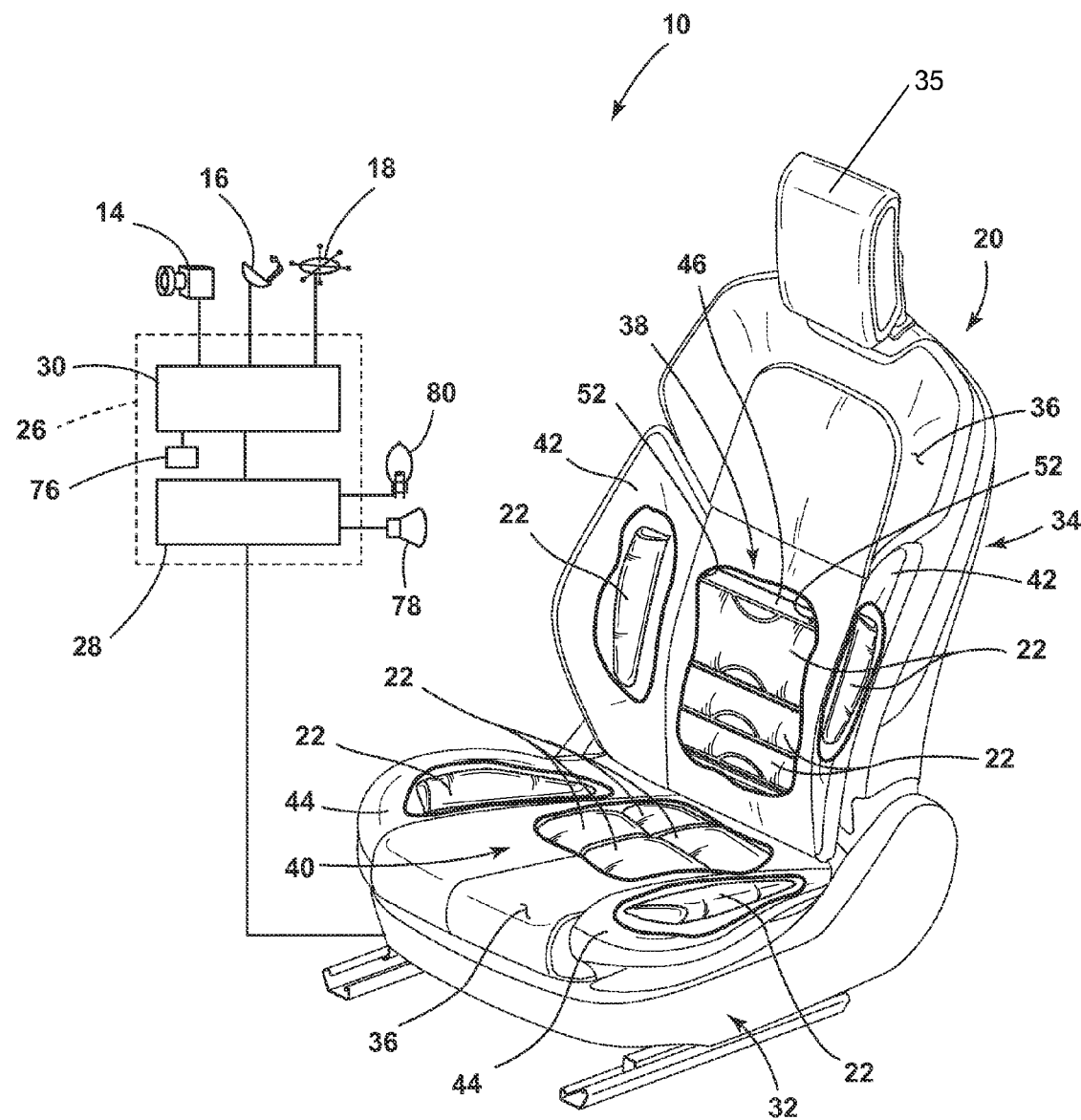
FIG. 1 is a diagram of a lane departure warning system, including a vehicle seat depicted in a front-perspective, partial-cutaway view.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
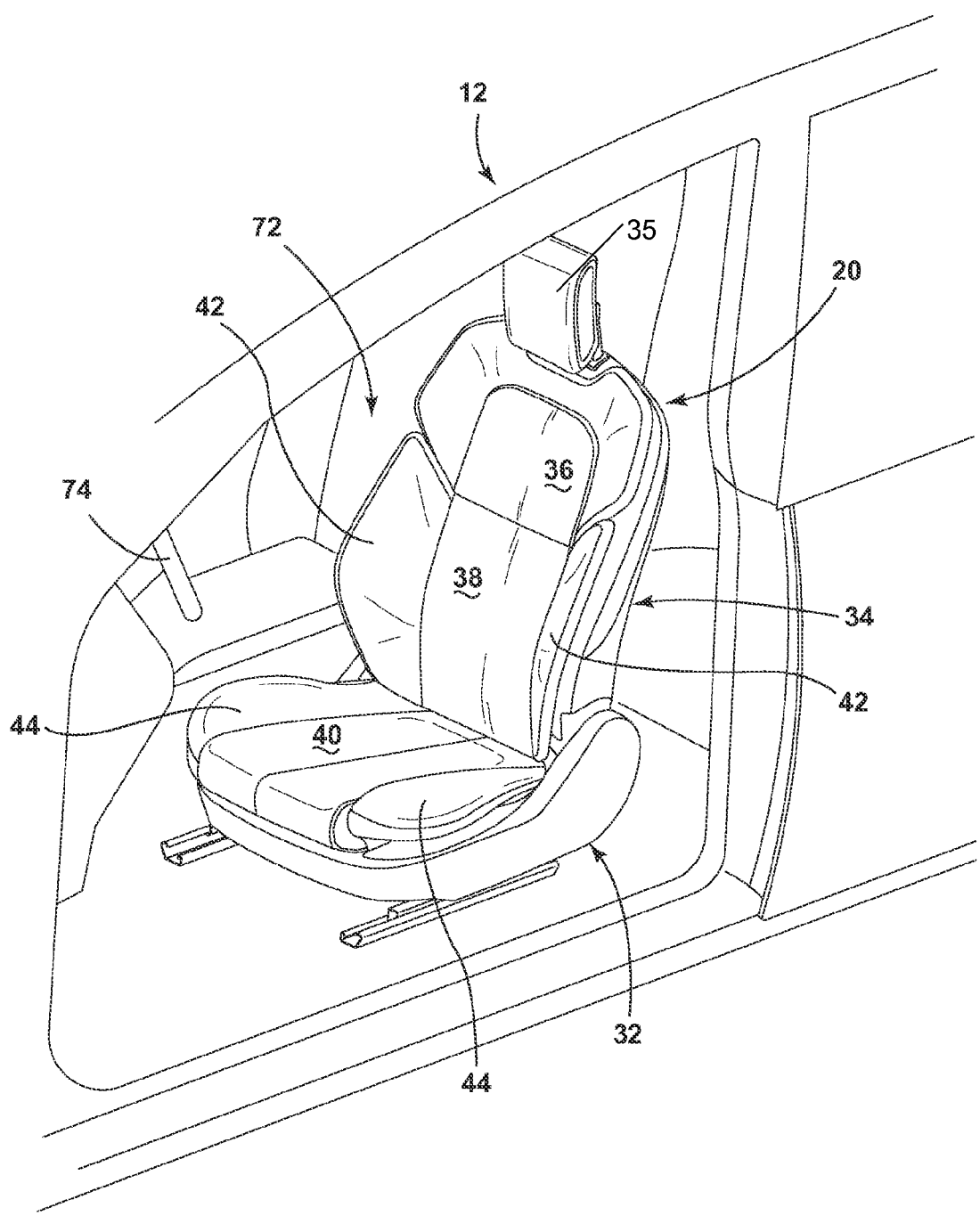
FIG. 2 is a partial view of an vehicle including the lane departure warning system of FIG. 1.

Referring to FIG. 1, reference numeral 10 generally designates a lane departure warning system. Lane departure warning system 10 can be used generally in a vehicle 12 (as shown in FIG. 2) and can include a positional input device, which can be in the form of optical imager 14 (which may be in the form of a camera or the like), global positioning system ("GPS") receiver 16, yaw sensor 18, or the like. System 10 can also include seat 20, including an inflatable bladder 22 therein and a vibrational unit 24 (FIG. 3) coupled with bladder 22. A controller 26 is communicatively coupled with the positional input device (such as at least one of optical imager 14, GPS receiver 16, and yaw sensor 18) and with vibrational unit 24 and includes electronic circuitry (such as processor 30) programmed to detect a lane departure of vehicle 12 based on a signal from the positional input device (such as at least one of optical imager 14, GPS receiver 16, and yaw sensor 18) and to cause vibrational unit 24 to vibrate in response thereto.

As further shown in FIG. 1, seat 20 can be an assembly of various components, including seat base or cushion 32, seatback 34, which is rotatably coupled with cushion 32, and headrest 35 which is coupled (and may be adjustable with respect to) seatback 34. The assembly of seat 20 can also include cover stock 36 in the form of various pieces of foam or other underlayment material and upholstery for seat 20, which can include various fabrics or natural or synthetic leather. Cover stock 36 may include various segments thereof that may be attached to each other and collectively attached to at least one of cushion 32, seatback 34, and headrest 35 and/or affixed with one of cushion 32, seatback 34, and headrest 35 in individual units. The assembly of seat 20 can also include several of the aforementioned bladders 22, which may be positioned in various strategic locations throughout cushion 32, seatback 34, and/or headrest 35 and may be independently moveable between an inflated state and a deflated state to allow for customization of the contour of both cushion 32 and seatback 34 based on the needs or desires of occupants of seat 20.

Bladders 22 may move into the inflated state by receiving pressurized air from an air source that may be in the form of a pump (which may be specific to the individual seat 20 or may be common among a number of similarly configured seats within vehicle 12) and a network of connecting tubes and manifolds facilitating fluid communication between the pump and the bladders 22 and selectively controlling the flow of pressurized air supply from pump to desired ones of bladders 22. Similarly, additional tubes and manifolds may fluidically couple bladders 22 with one or more vents (not shown) to allow for the release of air within bladders for movement thereof to the deflated position. In an example, the control of the air flow into and out of bladders 22 for movement thereof between the deflated and inflated position and vice-versa can be controlled by electronic circuitry including various analog switches or digital controls such as various electronic circuits, chips, and/or microprocessors that may be included in an on-board computer system within vehicle 12. In an example, including where a computer or the like is used to control the inflation and deflation of bladders 22, the "deflated" position of bladders 22 can be a state wherein some air remains within bladders 22 but such that bladders 22 are at a low end of the range of inflation thereof.

As also illustrated in FIG. 1, an example of seat 20 can include a number of bladders 22 including respective sets of bladders 22 within lumbar area 38 of seatback, within central area 40 of cushion 32, within seatback bolsters 42 and cushion bolsters 44, and within headrest 35. Bladders 22 within such varying regions of seat 20 can take on a number of forms that can generally include one or more polymeric (such as plastic) membranes, which may be strategically sealed together to form chambers. In any such construction, bladders 22 are generally impermeable to air, such that air within a bladder 22 that is in the inflated state remains at the desired inflation level.

As shown in FIGS. 3-6, various ones of bladders 22 can have one or more vibrational units 24 coupled therewith to transmit vibration therethrough, and further through overlying areas of cover stock 36, so as to be perceptible to a user occupying seat 20. As discussed above, vibrational units 24 can be communicatively coupled with controller 26 such that controller 26 can cause vibrational units 24 to transmit a signal in the form of vibration to an occupant of seat 20 in response to a detected departure of vehicle 12 from a road lane in which vehicle 12 is traveling. In various examples, it may be desirable for one or more vibrational units 24 to be coupled with ones of bladders 22 that are located within central area 40 of cushion 32, lumbar area 38 of seatback 34, and/or headrest 35, as an occupant of seat 20 is generally in constant or near constant of such areas of seat 20 when driving vehicle 12. Further, it is noted the at the inclusion of such vibrational motors 24 coupled with controller 26 are particularly suited for use in a driver seat of vehicle 12, as shown in FIG. 2.

Figure 3:
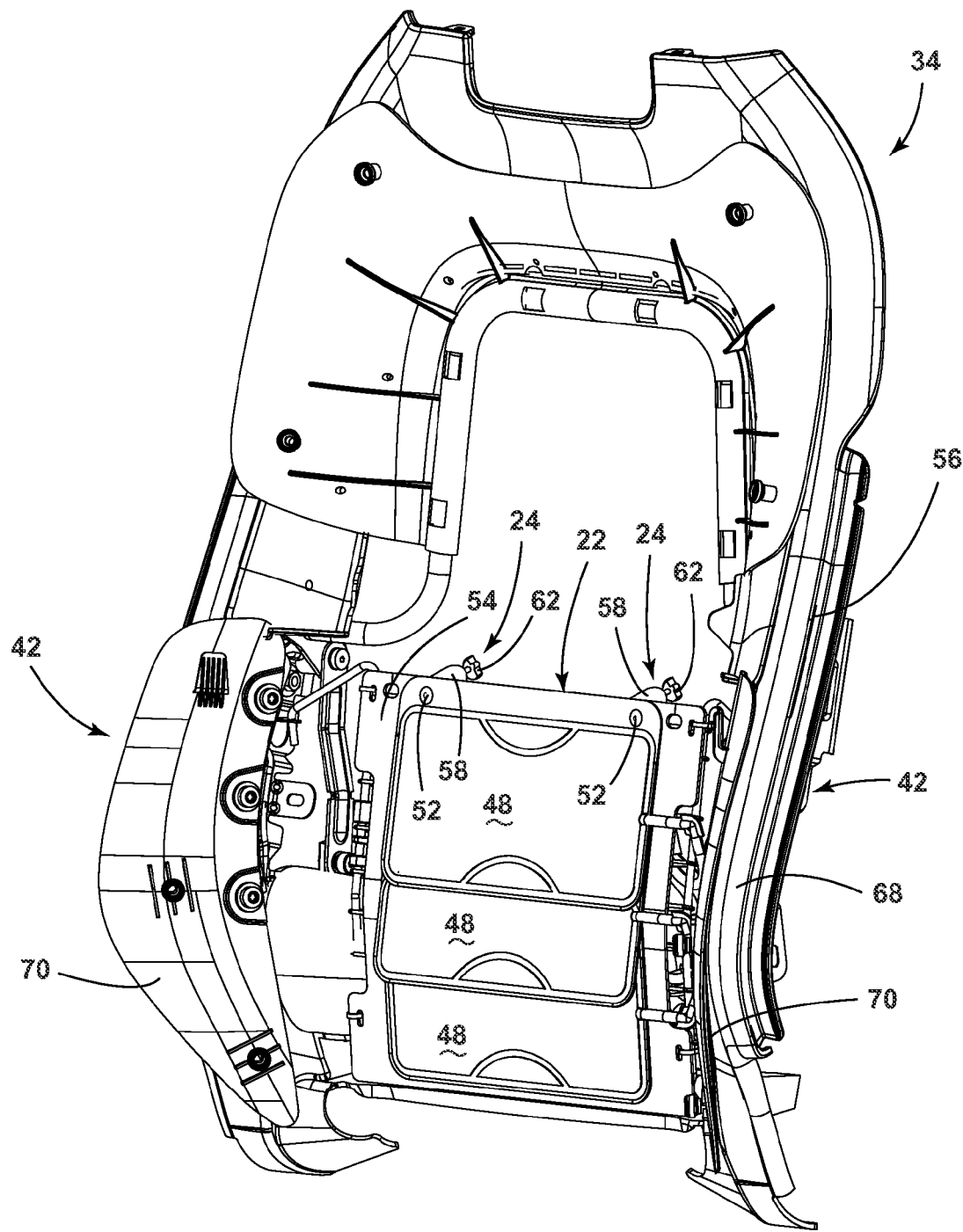
FIG. 3 is a front perspective view of internal components of the vehicle seat of FIG. 1.
Figure 4:
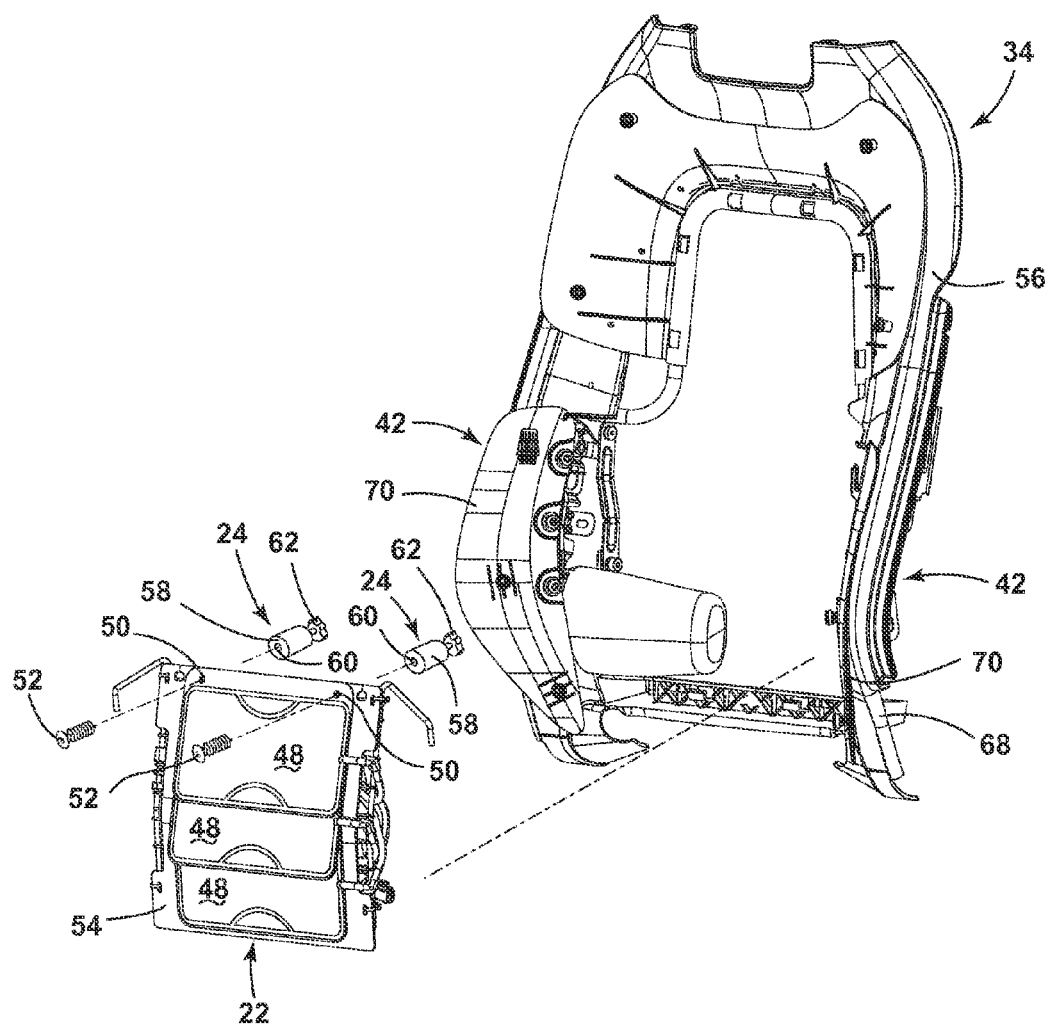
FIG. 4 is an exploded view of the components of FIG. 3.

As shown in FIGS. 3 and 4, one or vibrational units (such as two vibrational units 24, as shown in FIGS. 3 and 4) can be coupled with bladders 22 within lumbar area 38 of seatback 34. In the example shown, bladder 22 can include a border 46 around an edge thereof and outside of an associated cell 48 or otherwise inflatable portion thereof. Accordingly, bladder 22 can accommodate a hole 50 therein, without allowing escape of air from within cell 48 when bladder 22 is in an inflated state. Accordingly, hole 50 can receive a fastener 52 therethrough, which can join bladder 22 with carrier 54. In the example shown, carrier 54 can be moveably coupled with seat frame 56. In such a manner, bladders 22 within lumbar area 38 may be maintained in generally constant contact with the lower back of an occupant of seat 20. As shown in FIG. 4, vibrational units 24 may couple with fasteners 52 so as to be generally coupled with bladders 22. Accordingly, vibration thereof, such as at the direction of controller 26, can be transmitted through fastener 52 and into the associated bladder 22 thereby causing vibration of at least a portion of bladder 22, so as to be perceptible by an occupant of seat 20.

Figure 5:
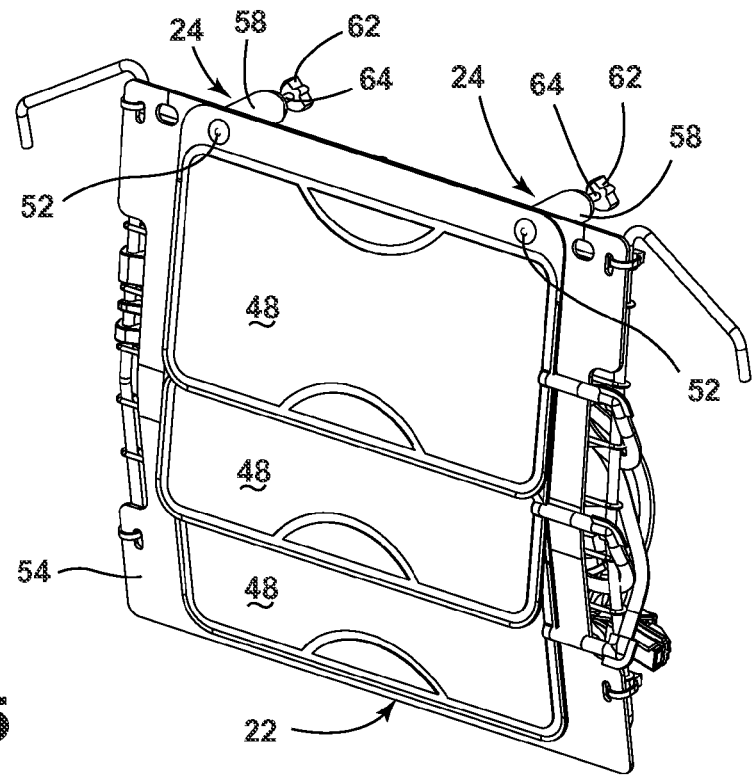
FIG. 5 is a front perspective view of one a subassembly of the internal components of FIG. 3.
Figure 6:
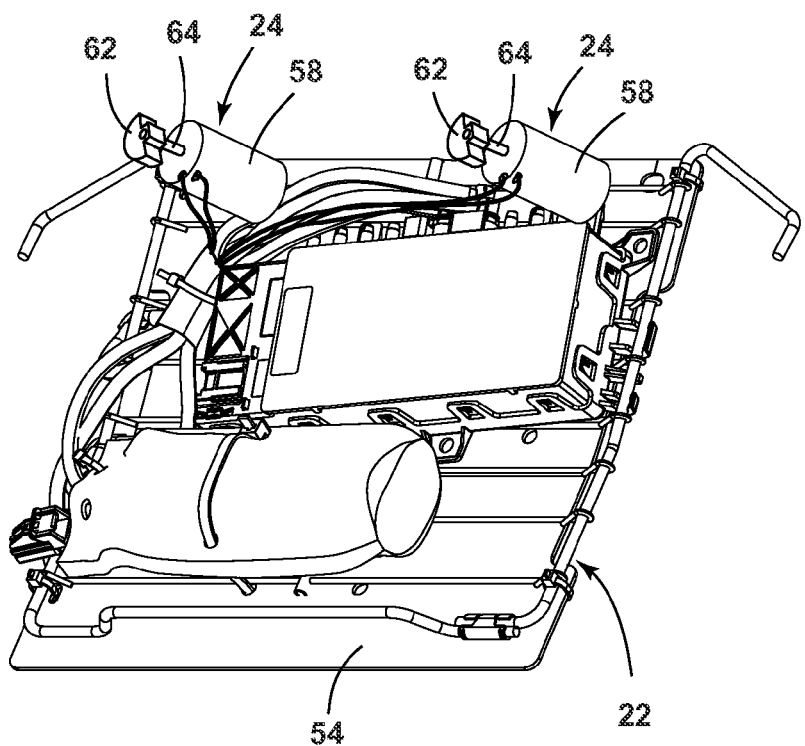
FIG. 6 is a rear perspective view of the subassembly of FIG. 5.

As can be generally seen in FIGS. 5 and 6, vibrational units 24 can include an electric motor 58, which can include a mounting hole 60 (FIG. 4) therein such that vibrational units 24 are mountable on respective fasteners 52. Electric motors 58 can be 12 Volt DC motor or the like and can be configured to rotate an output shaft 64 extending from a side thereof. An eccentric weight 62 is mounted on output shaft 64 of motor 58 such that rotation of the output shaft 64 causes eccentric weight 62 to rotate, thereby causing vibration of vibrational unit 24. As further illustrated in FIG. 4, fasteners 52 can be of a resiliently deformable polymeric material, such as nylon or the like, and can be adapted to press and/or snap fit through both hole 50 and bladder 22 and through a corresponding hole (not shown) in seatback carrier 54. Further, fasteners 52 can be longer than needed to join bladder 22 with carrier 54 such that a remaining portion of fastener 52 can be received in mounting hole 60 of motor 58. Corresponding portions of fasteners 52 may deform to facilitate a press-fit with mounting hole 60 so as to secure vibrational unit 24 with fastener 52. An example of a suitable fastener includes a fastener of a type generally referred to as a "Christmas tree" fastener, although other mechanical fasteners, such as screws, pins, or the like can be used.

Figure 7:
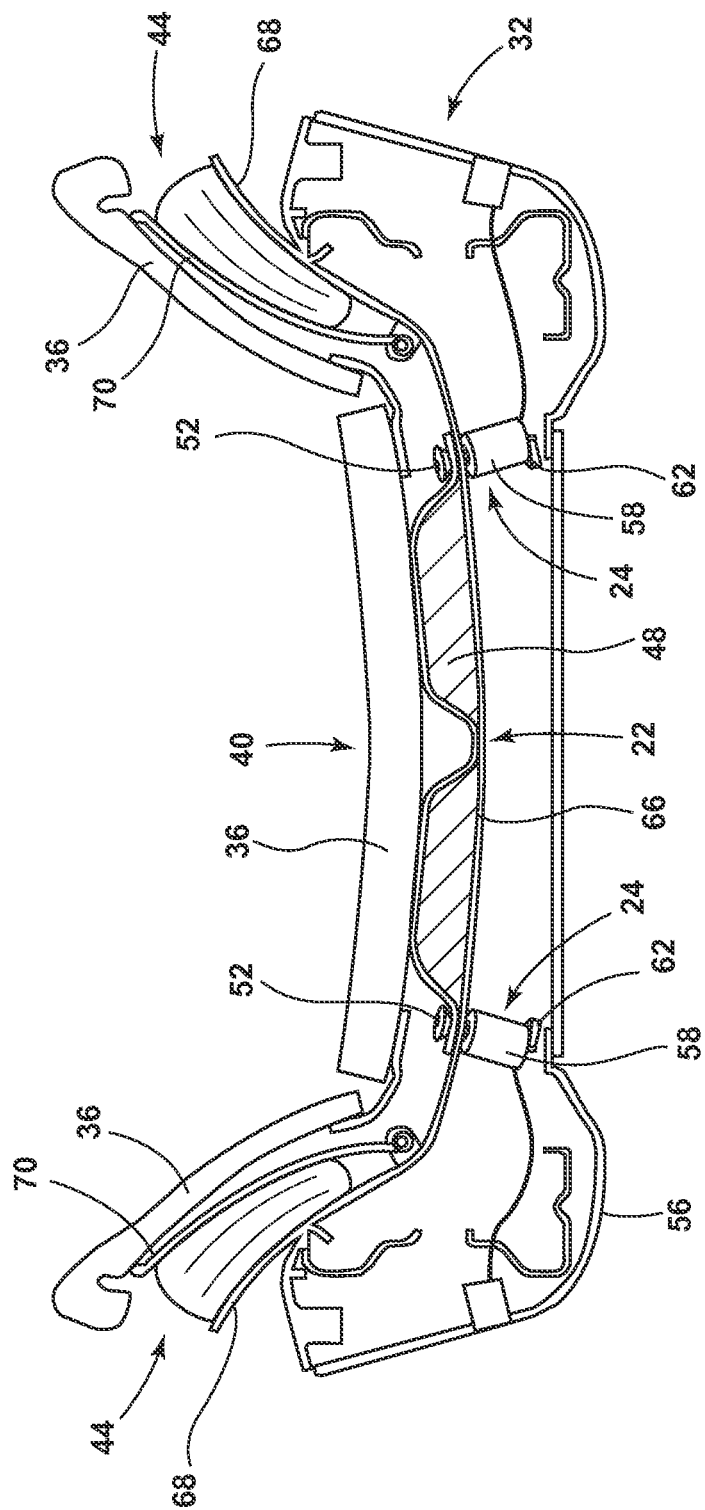
FIG. 7 is a front cutaway view of a seat cushion assembly useable in the vehicle seat of FIG. 1.

As shown in FIG. 7, additional or alternative vibrational units 24 can be coupled with a bladder 22 positioned within central area 40 of cushion 32. Such vibrational units 24 can be similarly affixed with bladder 22 by coupling of electric motor 58 with fastener 52, which is, in turn, used to couple bladder 22 with carrier 66 of cushion 32. Still further, additional ones of vibrational units 24 can be coupled with additional bladders 22 within seat 20, such as with bladders 22 positioned in bolsters 44. In the example shown in FIG. 7 bladders 22 positioned within bolsters 44 are coupled between a static projection 68 and a dynamic projection 70, which is moveable with respect to static projection 68. In this manner, movement of cushion 32 between the deflated and inflated positions causes movement of dynamic projection 70 with respect to static projection 68. Accordingly, vibration of bladder 22 within bolsters 44 can cause vibration of such bladder 22, which may be transmitted to dynamic projection 70 and through an overlying portion of cover stock 36, so as to be perceptible by an occupant of seat 20. In general, bolsters 44 may be adjustable in a manner just described so they can be comfortably positioned in contact with a portion of an occupant's leg, thereby making vibration of bolsters 44 perceptible to the occupant of seat 20. Additional vibrational units 24 may be similarly incorporated into bladders 22 positioned within seatback bolsters 42. Still further, additional vibrational units 24 may be coupled with additional bladders 22 positioned throughout seat 20, as desired, including within headrest 35.

As shown in FIG. 2, system 10 including seat 20, can be included in vehicle 12 with seat 20 positioned within interior 72 of vehicle 12. As shown, seat 20 is positioned as a driver seat of vehicle 12, such that seat 20 is positioned adjacent steering wheel 74 to allow an occupant of seat 20 to control the movement of vehicle 12. As previously discussed, system 10 can be in the general form of a lane departure warning system, having the ability to identify a situation in which vehicle 12, as controlled by the occupant of seat 20, for example, begins to unintentionally depart a lane in which vehicle 12 is traveling. System 10 is further capable of alerting the driver to such an unintentional lane departure so that the driver can correct the course of vehicle 12.

As shown in FIG. 1, controller 26 can include a processor 30 and memory 76. In other examples, controller 26 may employ other analog or digital control circuitry, including an application specific integrated circuit ("ASIC") or other known circuitry for processing input data, updating learned travel paths, executed one or more lane departure warning routines, outputting a lane departure warning, and uploading data to one or more central data bases. Processor 30 is capable of identifying a lane departure using memory 76, one or more GPS receivers 16, yaw sensor 18, and optical imager 14, such as a video camera or the like, according to a number of different modes of operation. In one example, processor 30 can "learn" common travel paths of vehicle 12 over time using GPS receiver 16, storing such learned travel paths in memory 76. During subsequent driving, an instantaneous path of vehicle 12 can be monitored by GPS receiver 16 and, when processor 30 identifies vehicle 12 as traveling along such a learned path, processor 30 can further monitor the motion of vehicle 12 using GPS receiver 16 for deviation from such a path. In certain situations, deviations from such a path can be identified as a lane departure. Additionally, system 10 can monitor a roadway on which vehicle 12 is traveling using optical imager 14, for identifiable lane markers. Similarly, under certain circumstances, visual identification of one or more such lane markers by optical imager 14 as moving laterally relative to vehicle 12 can be identified as a lane departure. Controller 26 can identify a potential lane departure according to other modes of operation in addition to those described herein.

Controller 26 can further use input from GPS receiver 16, yaw sensor 18, and optical imager 14 to indicate that a lane departure is intentional. In such an instance, controller 26 may determine that a warning is not needed. For example, yaw sensor 18 can be used to detect an instance in which vehicle 12 is executing a turn, such as in an intersection or the like, by measuring a rate of rotation of vehicle 12. In an example, if the rate of vehicle yaw exceeds a threshold (e.g., 0.35 radians per second) controller 26 may determine that a turn is being executed and that a lane departure warning is not necessary. Additionally, input from optical imager 14 can determine that lateral movement of vehicle 12 is in response to a change in path of the traveled vehicle lane itself, and that a lane departure warning is not necessary.

When processor 30 identifies a lane departure, for which a warning is desired, processor 30 can output a signal to communication module 28, which can then send a signal to one or more of the vibration units 24 within seat 20 to activate vibration of the associated bladder 22 or bladders 22. Additionally, communication module 28 can direct an audio system 78 of vehicle 12 to output an audio signal, and may further send a signal to a visual indicator 80, such as a light on the vehicle instrument panel (not shown) or elsewhere within vehicle 12, as a part of the lane departure warning. In a further example, communication module 28 can be electronically coupled with one or more of the valves associated with bladders 22, such that a warning signal in the form of vibration of bladders 22 can be implemented by causing such valves, which may be solenoid valves or the like, to pulse (including on both the input and output ends of bladder 22) such that vibration of bladder 22 is achieved by rapid inflation and deflation thereof.

In one embodiment, a lane departure warning may be implemented by system 10 in response to a detected lane departure by processor 30 that simulates movement of vehicle 12 over a highway rumble strip. Highway rumble strips may generally include physical features positioned on the shoulders of a road or highway that are configured to cause noticeable vibration of a vehicle, such as vehicle 12, when one or more tires passes thereover. Many drivers have been conditioned to respond well to the noise and vibration generated within a vehicle passing over such a rumble strip, making stimulation of such noise and vibration one effective means to potentially communicate a lane departure, including when a rumble strip is not located adjacent to the lane of travel. In one example, communication module 28 may be configured to cause vibrational units 24 to rotate at a speed sufficient to generate vibration in the general range of that caused by a vehicle passing over a rumble strip at highway speeds. In one example, such a frequency may be between about 80 Hz and 115 Hz. Further, vibrational units 24 may be selected to include a weight 62 of a sufficient mass and an electric motor 58 of a sufficient torque to produce such vibration at amplitude comparable to that of a vehicle passing over a highway rumble strip. Additionally, communication module 28 may output a signal to audio system 78 such that audio system 78 produces an audible warning that may generally replicates the sound within a vehicle passing over a highway rumble strip. Such an audio signal may be in the same general range as the vibration implemented by vibrational units 24 (such as by the audio signal generally matching the frequency of the vibration) and/or may include a computer-generated or a pre-recorded audio track of a vehicle passing over a rumble strip.

In a further example, controller 26 may be capable of determining a particular direction in which a lane departure is occurring and to associate such a direction with a corresponding side of vehicle 12 (i.e. a driver's side or a passenger's side). In response to such an identified lane departure, processor 30 may direct communication module 28 to send a signal to particular ones of vibrational units 24 positioned on a side of seat 20 that correspond to the identified side of the lane departure. In an example, if processor 30 detects a lane departure to the driver's side of vehicle 12, a signal may be sent by communication module 28 to vibrational units 24 located on an outboard side of seat 20 (i.e. further toward the driver side of seat 20), including within central area 40 of cushion 32, lumbar area 38 of seatback 34, and within the ones of bolsters 42 and 44 positioned on the outboard side of seat 20. Additionally, communication module 28 may direct audio system 78 to present an audible warning, such as a particular tone, through speakers positioned on a similarly corresponding side of vehicle 12 that may also direct a visual indicator 80 on such a side of vehicle 12 to present a visual warning signal. Implementation of a lane departure warning according to such a mode may be implemented with or without the above-mentioned highway rumble strip simulation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

We claim:

1. A lane departure warning system for a vehicle, comprising:
    a positional input device;
    a seat including:
        a cushion;
        a seat back coupled with the cushion;
        a carrier assembly within one of the cushion and the seatback, the carrier assembly including a body;
        an inflatable bladder;
        a vibrational unit; and
        a polymeric fastener that secures the inflatable bladder to the body of the carrier, wherein the vibrational unit is coupled with the bladder by being coupled with the polymeric fastener; and
    a controller communicatively coupled with the positional input device and with the vibrational unit and including electronic circuitry programmed to detect a lane departure based on a signal from the positional input device and to cause the vibrational unit to vibrate in response thereto a frequency of between about 80 Hz and 115 Hz to replicate a vibration of a seat in a vehicle traveling over a highway rumble strip.

2. The lane departure warning system of claim 1, further including a vehicle audio system, wherein the controller is further communicatively coupled with the vehicle audio system and the electronic circuitry is further programmed to cause the audio system to output an audible tone in response to the detected lane departure.

3. The lane departure warning system of claim 2, wherein the audio signal substantially matches the vibration frequency.

4. The lane departure warning system of claim 1, wherein:
    the inflatable bladder is a first inflatable bladder and is positioned on a first side of the seat, the vibrational unit coupled therewith being a first vibrational unit;
    the seat further includes a second inflatable bladder positioned on a second side of the seat, a second vibrational unit being coupled therewith;
    the controller is further communicatively coupled with the second vibrational unit; and
    the electronic circuitry is further programmed to determine a side of the vehicle to which the lane departure corresponds and to cause the one of the first and second vibrational units positioned on the side of the detected lane departure to vibrate in response thereto.

5. The lane departure warning system of claim 1, wherein:
    the positional input device is a first positional input device;
    the lane departure warning system further includes a second positional input device; and
    the controller communicatively coupled with the first and second positional input devices and the electronic circuitry is programmed to detect the lane departure based on signals from the first and second positional input devices.

6. The lane departure warning system of claim 1, wherein the positional input device is one of: a GPS receiver, an optical imager, and a vehicle yaw sensor.

7. A vehicle seating assembly, comprising:
    a seat base;
    a seatback coupled with the base;
    a headrest coupled with the seatback;
    a carrier disposed in an interior of at least one of the seat base, the seatback, and the headrest, and having an inflatable bladder coupled with the carrier by a polymeric connector and configured to move between a first position, wherein the bladder is deflated, and a second position, wherein the bladder is inflated; and
    a vibrational unit coupled with the polymeric connector and configured to generate a vibration of a frequency between 80 Hz and 115 Hz to replicate a vibration of a seat in a vehicle traveling over a highway rumble strip.

8. The vehicle seating assembly of claim 7, wherein the vibrational unit includes an electric motor having an eccentric weight coupled with an output shaft thereof.

9. The vehicle seating assembly of claim 7:
    further including bolsters extending laterally from one of the seatback and the seat; and
    wherein the carrier, inflatable bladder, and polymeric connector are disposed within one of the bolsters.

10. The vehicle seating assembly of claim 7, further including a lane departure warning controller communicatively coupled with the vibrational unit and including electronic circuitry programmed to cause the vibrational unit to vibrate in response to a detected lane departure.

11. A motor vehicle, comprising:

a positional input device;

a seat having therein a carrier, an inflatable bladder coupled with the carrier by a polymeric fastener, and a vibrational unit coupled with the polymeric fastener; and a lane departure warning controller communicatively coupled with the positional input device and with the vibrational unit and including electronic circuitry programmed to detect a lane departure based on a signal from the positional input device and to cause the vibrational unit to vibrate in response thereto at frequency of between about 80 Hz and 115 Hz to replicate a vibration of a seat in a vehicle traveling over a highway rumble strip.

12. The motor vehicle of claim 11, further including an audio system, the controller being further communicatively coupled with the audio system, and the electronic circuitry being further programmed to cause the audio system to output an audible tone in response to the detected lane departure.

13. The motor vehicle of claim 11, wherein the audio signal substantially matches the frequency of the vibration.

14. The motor vehicle of claim 13, wherein:

the controller causes the vibrational unit to vibrate in response to the detected lane departure in a manner that replicates a vibration of a seat in a vehicle traveling over a highway rumble strip; and the audio signal replicates a sound of a vehicle traveling over a highway rumble strip.

15. The motor vehicle of claim 11, wherein:

the inflatable bladder is a first inflatable bladder and is positioned on a first side of the seat, the vibrational unit coupled therewith being a first vibrational unit;

the seat further includes a second inflatable bladder positioned on a second side of the seat, a second vibrational unit being coupled therewith;

the controller is further communicatively coupled with the second vibrational unit; and the electronic circuitry is further programmed to determine a side of the vehicle to which the departure corresponds and to cause the one of the first and second vibrational units positioned on the side of the detected lane departure to vibrate in response thereto.

* * * * *